United States Patent
Lee et al.

(10) Patent No.: US 9,460,079 B2
(45) Date of Patent: Oct. 4, 2016

(54) METHOD, SYSTEM AND RECORDING MEDIUM FOR PROVIDING DICTIONARY FUNCTION AND FILE DISTRIBUTION SYSTEM

(71) Applicant: NAVER CORPORATION, Seongnam-si, Gyeonggi-do (KR)

(72) Inventors: Tae Hoon Lee, Seongnam-si (KR); Jonghwan Kim, Seongnam-si (KR); Eunjoo Jeon, Seongnam-si (KR); Ryan Kim, Seongnam-si (KR); Jin A. Jung, Seongnam-si (KR); Taihwa Hong, Seongnam-si (KR); Kyung Eun Lee, Seongnam-si (KR); Haengchul Shin, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 0 days.

(21) Appl. No.: 14/688,053

(22) Filed: Apr. 16, 2015

(65) Prior Publication Data

US 2015/0347389 A1 Dec. 3, 2015

(30) Foreign Application Priority Data

May 27, 2014 (KR) .................. 10-2014-0063773

(51) Int. Cl.
*G06F 17/27* (2006.01)
*G06F 17/28* (2006.01)

(52) U.S. Cl.
CPC ......... *G06F 17/2735* (2013.01); *G06F 17/289* (2013.01)

(58) Field of Classification Search
None
See application file for complete search history.

(56) References Cited

U.S. PATENT DOCUMENTS

| 2011/0119046 A1* | 5/2011 | Shinozaki | G06F 17/2735 704/2 |
| 2012/0089582 A1* | 4/2012 | Kumar | G06F 3/017 707/706 |
| 2013/0211819 A1* | 8/2013 | Kagan | G06F 17/2818 704/3 |

FOREIGN PATENT DOCUMENTS

| JP | H07-334526- | 12/1995 |
| JP | 2003-157268 A | 5/2003 |
| JP | 2004-062227 A | 2/2004 |
| JP | 2010-277178 A | 12/2010 |
| JP | 2014-505939 A | 3/2014 |
| WO | WO-2012/092709 A1 | 7/2012 |

OTHER PUBLICATIONS

Japanese Office Action issued on Jul. 5, 2016 by the Japanese Patent Office for corresponding Japanese Patent Application No. 2015-082322.
Miki, Takano, Try 42th Masterpiece of free software—Don't be afraid of any Website in English! by simple operation, Translate it to Japanese as a whole "King Soft Dictionary," Nikkei PC21, Japan, Nikkei BP Inc., 2009, 10. 01, vol. 14, No. 19, pp. 144-145.

* cited by examiner

*Primary Examiner* — Qian Yang
(74) *Attorney, Agent, or Firm* — Harness, Dickey & Pierce, P.L.C.

(57) ABSTRACT

A method of providing a dictionary service may include configuring a first area of a display to receive a keyword as an input thereto and a second area of the display to display a dictionary search result of the keyword when the user terminal is operating in a dictionary mode; switching from the dictionary mode to a translation mode in response to the keyword input into the first area being greater than or equal to a threshold length; and setting the extended keyword as a source text to translate and display in a third area of the display.

20 Claims, 14 Drawing Sheets

FIG. 11 best effort to save our planet and the animals.

— A

A' — 행성과 동물을 지키기 위한 최선의 노력.

1108 —
Planet
☆
🔊 US          🔊 UK
[plænɪt]       [plænɪt]
1. 행성
2. (특히 환경과 관련하여 말할 때)세상 best effort to
save our planet
and the animals.

B — 과 동물을 지키기 위한
최선의 노력.

1208 — 행성 (行星)

planet

METHOD, SYSTEM AND RECORDING MEDIUM FOR PROVIDING DICTIONARY FUNCTION AND FILE DISTRIBUTION SYSTEM

CROSS-REFERENCE TO RELATED APPLICATION

This application claims priority from and the benefit of Korean Patent Application No. 10-2014-0063773, filed on May 27, 2014, the entire contents of which are hereby incorporated by reference.

BACKGROUND

1. Field

Example embodiments relate to a technology capable of providing a dictionary function in a portable terminal.

2. Description of the Background

Early mobile communication terminals may have only provided a portable call function However, recent mobile communication terminals may include a variety of multimedia functions such as MP3 and wireless Internet beyond the portable call function. Many additional services, for example, a mobile game and the wireless Internet, capable of utilizing multimedia functions of a mobile communication terminal are being provided.

Many mobile communication terminals may implement a wireless Internet service using a wireless Internet browser, for example, a wireless application protocol (WAP) browser and a Micro Edition (ME) browser. Further, many mobile communications terminals may conduct a search on a variety of information without restrictions on a time and an occasion, using a wireless Internet platform, for example, a general virtual machine (GVM), a binary runtime environment for wireless (BREW), and Java.

SUMMARY

Example embodiments provide a dictionary function providing method and system that may provide a dictionary function suitable for an offline environment of a mobile terminal.

Example embodiments also provide a dictionary function providing method and system that may provide a dictionary function combined with a translation function.

Example embodiments also provide a dictionary function providing method and system that includes a user interface/user experience (UI/UX) of automatically switching from a dictionary function to a translation function.

Example embodiments also provide a dictionary function providing method and system that may provide dictionary information including an auto-completion result about a keyword in an offline environment.

According to some example embodiments, the dictionary function providing method implemented in a computer may include executing a dictionary mode including a first area for receiving a keyword and a second area for displaying a dictionary search result of the keyword; and automatically switching from the dictionary mode to a translation mode in response to an input of the keyword being extended to a threshold length on the first area, wherein the automatically switching includes switching to the translation mode including a third area for receiving the extended keyword as a source text to be translated.

Other example embodiments relate to a service server.

In some example embodiments, the service server may include a loader configured to download basic dictionary information including a headword for each word and a meaning of a desired (or, alternatively, predetermined) number of characters with respect to a list of entire words included in a dictionary database with respect to a user terminal in which a dictionary application including a dictionary mode and a translation mode is installed; and a provider configured to provide dictionary information associated with a keyword on the dictionary database in response to a request from the user terminal for an additional dictionary search for the keyword in the dictionary mode, and to provide a translation of the keyword through interaction with a translation engine in response to a request from the user terminal for translating the keyword in the translation mode, wherein the user terminal is configured to display a dictionary search result corresponding to the keyword using the basic dictionary information in the dictionary mode, to request an additional dictionary search for the keyword in response to a selection of a desired (or, alternatively, predetermined) word from the dictionary search result, and to automatically switch from the dictionary mode to the translation mode and to request to translate the keyword in response to an input of the keyword being extended to a threshold length.

Other example embodiments relate to a non-transitory computer-readable media.

In some example embodiments, the non-transitory computer-readable media may include an instruction to control a computer system to provide an augmented reality function, wherein the instruction controls the computer system by a method including executing a dictionary mode including a first area for receiving a keyword and a second area for displaying a dictionary search result of the keyword; and automatically switching from the dictionary mode to a translation mode in response to an input of the keyword being extended to a threshold length on the first area, and the automatically switching includes switching to the translation mode including a third area for receiving the extended keyword as a source text to be translated.

Other example embodiments relate to a file distribution system for distributing a file of an application to be installed in a user terminal.

In some example embodiments, the file distribution system includes a file transmitter configured to transmit the file in response to a request from the user terminal, wherein the application includes a module configured to control the user terminal to execute a dictionary mode including a first area for receiving a keyword and a second area for displaying a dictionary search result of the keyword; and a module configured to control the user terminal to automatically switch from the dictionary mode to a translation mode in response to an input of the keyword being extended to a threshold length on the first area, and the module configured to control the user terminal to automatically switch to the translation mode switches to the translation mode including a third area for receiving the extended keyword as a source text to be translated.

Other example embodiments relate to a dictionary function providing method implemented by a computer.

In some example embodiments, the method may include configuring a local database by downloading in advance basic dictionary information including a headword for each word and a meaning of a desired (or, alternatively, predetermined) number of characters with respect to a list of entire words included in a dictionary database on a server; and searching the local database in response to an input of a keyword, and displaying a dictionary search result including one or more auto-complete words corresponding to the keyword and a meaning for each auto-complete word.

Some example embodiments relate to a user terminal configured to execute a dictionary application thereon.

In some example embodiments, the user terminal includes a display; an input interface configured to receive an input from a user; a network interface configured to communicate with a server; and a processor.

In some example embodiments, the processor is configured to, store, in a local database, basic dictionary information received from the server, the basic dictionary information including a dictionary of words in which, for each of the words, an abbreviated meaning is included therein, receive, via the input interface, a keyword input by the user, search the local database for a dictionary search result based on the keyword, and display the dictionary search result on the display.

In some example embodiments, the dictionary search result includes a plurality of candidate words corresponding to the keyword, and the processor is configured to display the plurality of candidate words sorted by a similarity between a respective one of the plurality of candidate words and the keyword.

In some example embodiments, the processor is configured to download the basic dictionary information from the server when the dictionary application is installed or upgraded.

In some example embodiments, the processor is configured to, determine if the user is requesting translation of the keyword based on whether the keyword input by the user is a phrase that includes two words separated by a space, request, via the network interface, a translation of the phrase by the server, if the processor determines that the keyword is the phrase, and display the translation on the display.

In some example embodiments, the processor is configured to receive, via the input interface, a selection indicating a selected word from the translation, and request, via the network interface, an unabridged definition of the selected word in response to the selection.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

FIGS. 5 through 12 illustrate examples of a service screen of a dictionary mode and a translation mode according to example embodiments;

DETAILED DESCRIPTION

Figure 1:
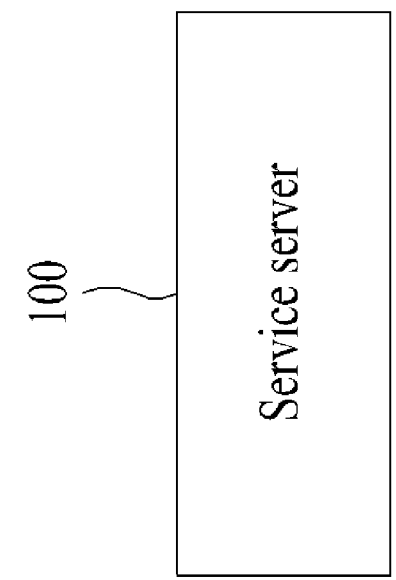
FIG. 1 is a diagram illustrating a relationship between a service server and a user terminal according to example embodiments.
Figure 1:
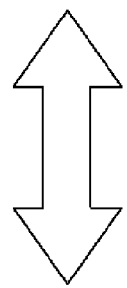
Figure 1:
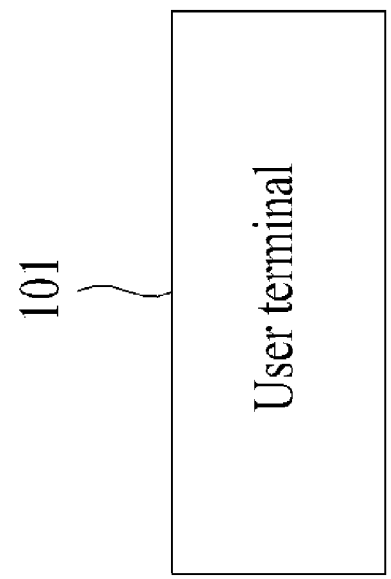

Example embodiments are described more fully hereinafter with reference to the accompanying drawings, in which some example embodiments are shown. The example embodiments may, however, be embodied in many different forms and should not be construed as limited to the example embodiments set forth herein. Rather, these example embodiments are provided so that this disclosure is thorough, and will fully convey the scope of the example embodiments to those skilled in the art. In the drawings, the size and relative sizes of layers and areas may be exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

The example embodiments relate to a method and system for providing a dictionary function. For example, at least some example embodiments relate to a method and system for providing a dictionary function including an auto-completion function based on pre-downloaded dictionary information, and a dictionary function providing method and system that may automatically switch to a translator in response to a keyword input.

According to example embodiments, it may be possible to verify simple dictionary information in real time within a user terminal in an offline environment by downloading in advance a portion of dictionary information to the user terminal and thereby configuring a local database. By switching to an online environment in response to a user request, it is possible to verify detail dictionary information provided from a service server through additional download or a web.

Also, according to example embodiments, it may be possible to configure an enhanced dictionary performance even in an offline environment by providing dictionary information including an auto-completion result about a keyword using a local database.

Also, according to example embodiments, it may be possible to provide a further convenient and intelligent strategic service by providing an application in which a dictionary function and a translation function are combined and by configuring a dictionary and a translator together through the application.

Also, according to example embodiments, when a keyword input for a dictionary search is extended and accordingly, a sentence of a desired (or, alternatively, predetermined) length or more is recognized, switching to user interface (UI)/user experience (UE) of a translation mode may be automatically performed and thus, a user may intuitively recognize the switching from a dictionary to a translator.

FIG. 1 is a diagram illustrating a relationship between a service server and a user terminal according to example embodiments.

Referring to FIG. 1, FIG. 1 illustrates a user terminal 101 and a service server 100. In FIG. 1, an indicator with an arrowhead indicates that data may be transmitted and/or received between the user terminal 101 and the service server 100 over a wireless network.

In some example embodiments, the service server 100 may include one or more physical computer hardware systems that are configured to provide services for client devices (e.g., user terminals 101, etc.) connected to a communications network. The service server 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). The service server 100 may be configured to establish, manage, and terminate one or more communications sessions between one or more of the client devices.

The service server 100 may be connected to one or more local and/or remote databases (not shown).

According to various embodiments, service server 100 and the user terminal 101 may communicate with each other via a communications network (not shown). The communications network may be any interconnected network of computing devices. The communications network may be configured to operate various communication networks such as a personal area network (PAN), a local area network (LAN), a metropolitan area network (MAN), or a wide area network (WAN). Further, the communications network may be the internet. In some embodiments, the communications network may use a wireless transmission technique which is used for a short range communication, such as infrared data association (IrDA) or a Bluetooth.

The service server 100 may serve as a service platform to provide a dictionary-translation service in which a dictionary function and a translation function are combined with respect to a client.

For example, the service server 100 may provide dictionary information corresponding to a keyword requested from the user terminal 101 through a dictionary service platform including a dictionary database, and provide a translation of a source text requested from the user terminal 101 through interaction with a translation engine configured to translate a sentence (hereinafter, a source text) of a source language and a sentence (hereinafter, a translation) of a target language.

A dictionary App for a dictionary-translation service may provide dictionary information corresponding to a keyword using basic dictionary information configured as a local database within the user terminal 101. Further, the dictionary App may further receive, from the service server 100, and display additional dictionary information about a keyword input from a user, and receive, from the service server 100, and display a translation of a sentence input from the user.

The user terminal 101 may be a mobile device such as a smartphone, a tablet, and/or a wearable computer, or any type of terminal device capable of installing and executing a service exclusive application (hereinafter, a dictionary App) associated with the service server 100. Here, the user terminal 101 may perform the overall service operation such as a service screen configuration, a data input, a data transmission and reception, and a data storage, under control of the dictionary App.

Figure 2:
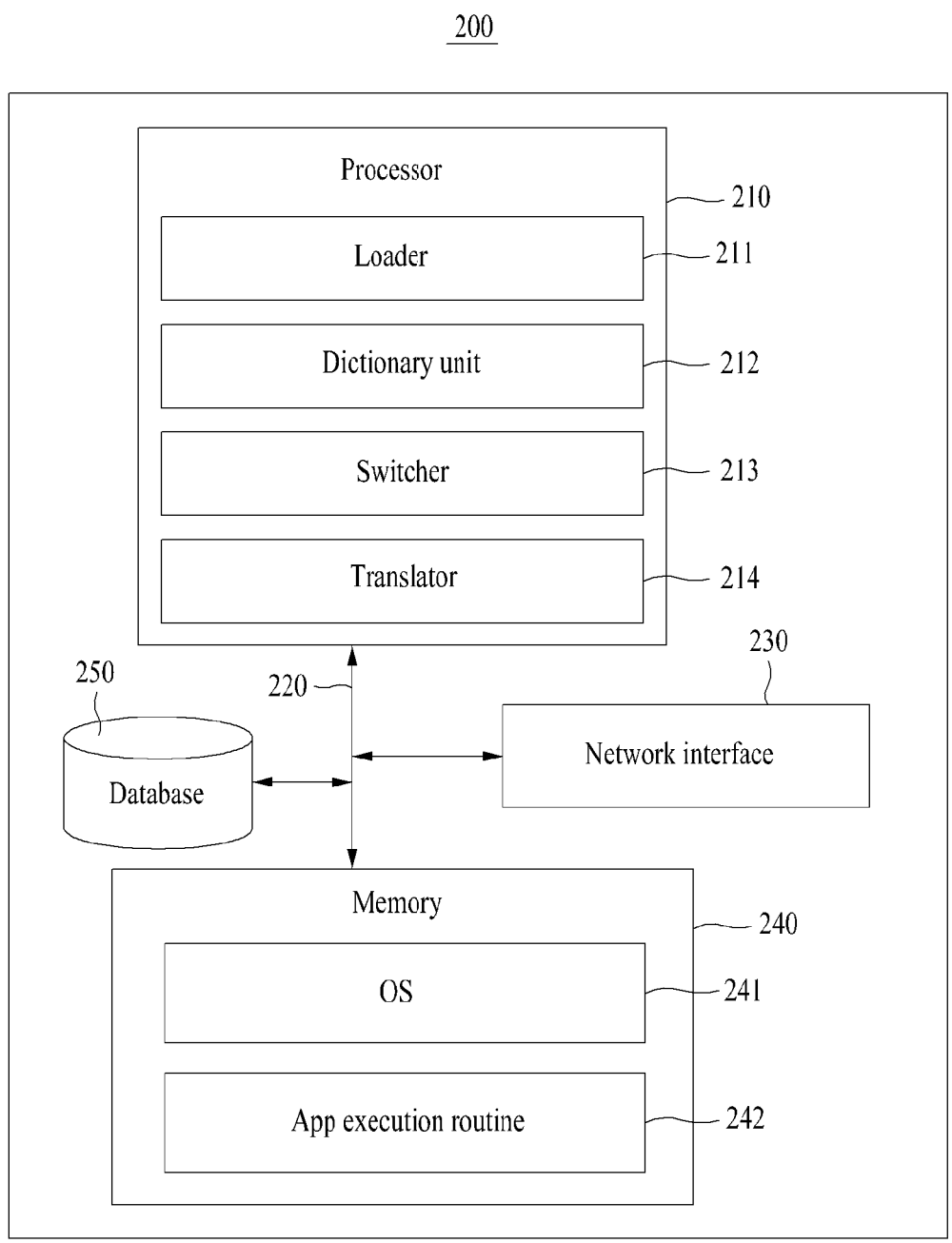
FIG. 2 is a block diagram illustrating a configuration of a dictionary function providing system according to example embodiments.

FIG. 2 is a block diagram illustrating a configuration of a dictionary function providing system 200 according to example embodiments.

Referring to FIG. 2, the user terminal 101 may include a dictionary function providing system 200 that includes a processor 210, a bus 220, a network interface 230, a memory 240, and a database 250.

The memory 240 may include an operating system (OS) 241 and an App execution routine 242. The processor 210 may include a loader 211, a dictionary unit 212, a switcher 213, and a translator 214. According to other example embodiments, the dictionary function providing system 200 may additional elements beyond those illustrated in FIG. 2.

The user terminal 101 may be an entity directly using a dictionary-translation service, and the dictionary function providing system 200 may provide a service environment in which a dictionary function and a translation function are combined with respect to the user terminal 101 that is a client, through interaction with the service server 100 in a client-server environment.

The memory 240 may be as non-transitory computer readable media and may include a permanent mass storage device such as random access memory (RAM), read only memory (ROM), and a disk drive. Also, a program code for the OS 241 and the App execution routine 242 may be stored in the memory 240. The software constituent elements may be loaded from a non-transitory computer-readable media separate from the memory 240 using a drive mechanism (not shown). The non-transitory computer-readable media may include computer-readable media such as a floppy disk, a tape, a DVD/CD-ROM drive, and a memory card. According to other example embodiments, the software constituent elements may be loaded to the memory 240 through the network interface 230, instead of using the non-transitory computer readable media.

The memory 240 may be configured to store program code for one or more operating systems and/or program code for performing operations according to example embodiments. The program code may include software modules, firmware, middleware, microcode, hardware description languages, and/or any other like set of instructions.

The bus 220 may enable communication and data transmission between the constituent elements of the dictionary function providing system 200. The bus 220 may be configured using a high-speed serial bus, a parallel bus, a storage area network (SAN), and/or other appropriate communication technologies.

The network interface 230 may be a computer hardware element configured to connect the dictionary function providing system 200 to a computer network through a wireless or wired connection. For example, the network interface 230 may communicate with the other computer systems via a cellular phone network, a wireless network such as a WLAN and/or metropolitan area network (MAN), an Internet network such as an intranet and/or World Wide Web (WWW).

The wireless communication may include Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, and/or IEEE 802.11n, voice over Internet Protocol (VoIP), Wi-MAX, Long Term Evolution (LTE), an email protocol such as Internet Message Access Protocol (IMAP) and/or Post Office Protocol (POP), an instance messaging such as eXtensible Messaging and Presence Protocol (XMPP), Session Initiation Protocol for Instant Messaging and Presence Leveraging Extensions (SIMPLE), Instant Messaging and Presence Service (IMPS), and Short Message Service (SMS), or any other like communication protocols. The wireless communication may employ a plurality of communication standards, protocols, and technologies, without being limited to the above examples.

The database 250 may be configured by the processor 210 executing the dictionary App, and serves to store and maintain basic dictionary information to provide a dictionary function in an offline local environment.

For example, the basic dictionary information provided in the offline local environment may include a headword for each word and at least a portion of meanings with respect to a list of words included in a dictionary database on a service server and additional data for an auto-completion function of a keyword. For example, at least a portion of the meanings may be limited to a main meaning including 20 or fewer characters among a plurality of meanings of a word.

For example, the processor 210 may be any device capable of processing data including, for example, a microprocessor configured to carry out specific operations by performing arithmetical, logical, and input/output operations based on input data, or capable of executing instructions included in computer readable code stored in the memory. The processor may be a logic chip, for example, a central processing unit (CPU), a controller, or an application-specific integrated circuit (ASIC), that when, executing the instructions stored in the memory, configures the processor as a special purpose machine to perform the functions of the loader 211, the dictionary unit 212, the switcher 213, and the translator 214, for example, by performing operations S410 through S450 of FIG. 4. Therefore, the processor 210 may improve the operation of the user terminal 101 itself by reducing a time taken to provide simple dictionary information in real time when the user terminal 210 is offline and by more quickly switching from a dictionary mode to a translation mode based on a size of the keyword input thereto.

Figure 3:
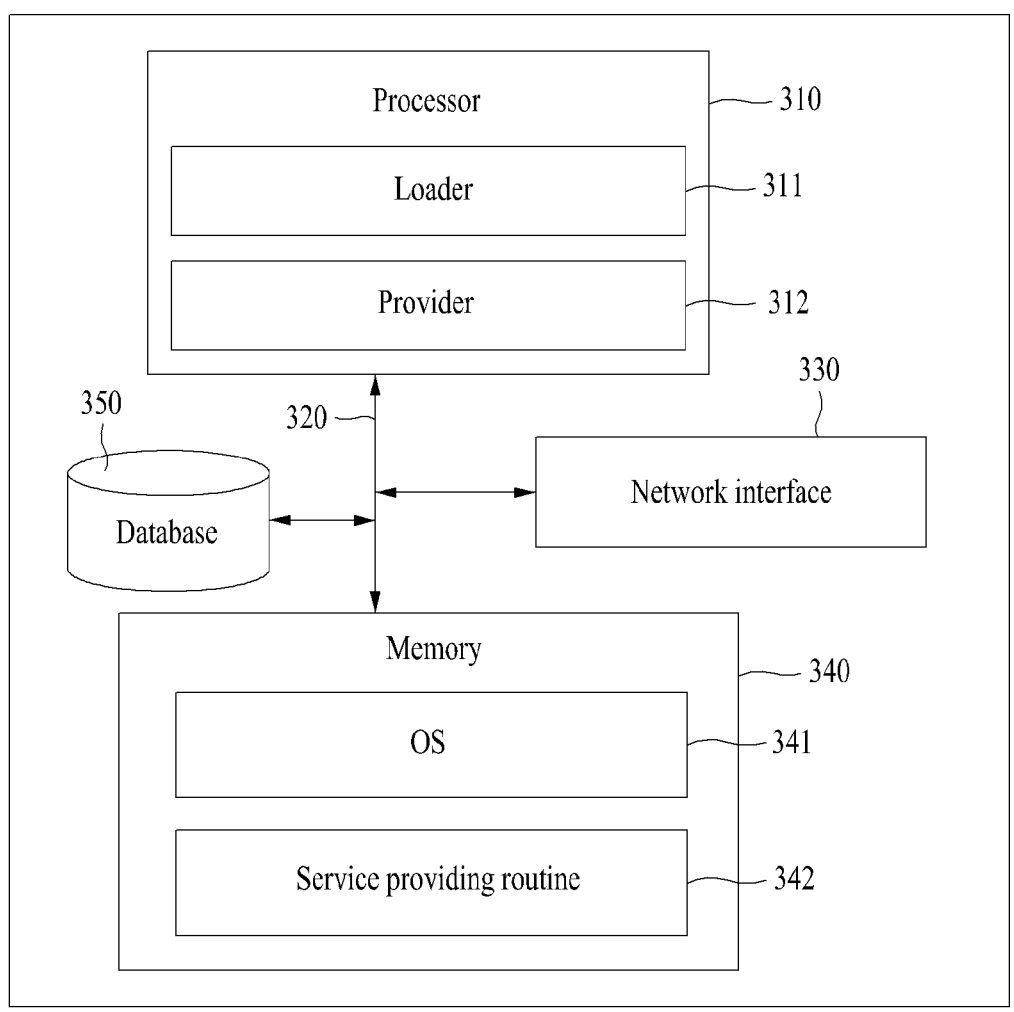
FIG. 3 is a block diagram illustrating a configuration of a service server to provide a dictionary-translation service according to example embodiments.

FIG. 3 is a block diagram illustrating a configuration of a service server 300 to provide a dictionary-translation service according to example embodiments.

Referring to FIG. 3, the service server 300 may include a processor 310, a bus 320, a network interface 330, a memory 340, and a database 350.

The memory 340 may include an OS 341 and a service providing routine 342. The processor 310 may include a loader 311 and a provider 312. Depending on other embodiments, the service server 300 may include a more number of constituent elements than the number of constituent elements of FIG. 3.

The memory 340 may include a non-transitory computer readable media, for example, a permanent mass storage device such as RAM, ROM, and a disk drive. Also, a program code for the OS 341 and the service providing routine 342 may be stored in the memory 340. The software constituent elements may be loaded from non-transitory computer-readable media separate from the memory 340 using a drive mechanism (not shown). The non-transitory computer-readable media may include computer-readable media such as a floppy disk, a tape, a DVD/CD-ROM drive, and a memory card. According to other example embodiments, the software constituent elements may be loaded to the memory 340 through the network interface 330, instead of using the non-transitory computer readable media.

The memory 340 may be configured to store program code for one or more operating systems and/or program code for performing operations according to example embodiments. The program code may include software modules, firmware, middleware, microcode, hardware description languages, and/or any other like set of instructions.

The bus 320 enables communication and data transmission between constituent elements of the service server 300. The bus 320 may be configured using a high-speed serial bus, a parallel bus, a SAN, and/or other appropriate communication technologies.

The network interface 330 may be a computer hardware constituent element to connect the service server 300 to a computer network. The network interface 330 may connect the service server 300 to the computer network through a wireless or wired connection.

The database 350 serves to store and maintain the entire dictionary information for a dictionary service. The database 350 on the service server 300 may include a headword for each word and the entire meanings of a corresponding word with respect to a list of entire words, an inflectional word or a derived word, a related word/idiom, synonym/antonym, a related example text, a translation of an example text, and comments on a translation. Although FIG. 3 illustrates that the database 350 is included in the service server 300, the database 350 may be present as an external database constructed on a separate system.

The processor 310 may be configured to process an instruction of a computer program by performing a basic arithmetic and logic operation, and an I/O operation of the service server 300. The instruction may be provided from the memory 340 or the network interface 330 to the processor 310 through the bus 320. The processor 310 may be configured to execute a program code for the loader 311 and the provider 312. The program code may be stored in a storage device such as the memory 340.

For example, the processor 310 may be any device capable of processing data including, for example, a microprocessor configured to carry out specific operations by performing arithmetical, logical, and input/output operations based on input data, or capable of executing instructions included in computer readable code stored in the memory. The processor may be a logic chip, for example, a central processing unit (CPU), a controller, or an application-specific integrated circuit (ASIC), that when, executing the instructions stored in the memory, configures the processor as a special purpose machine to perform the functions of the loader 311 and the provider 312, for example, by performing operations S1410 through S1430 of FIG. 14.

Figure 4:
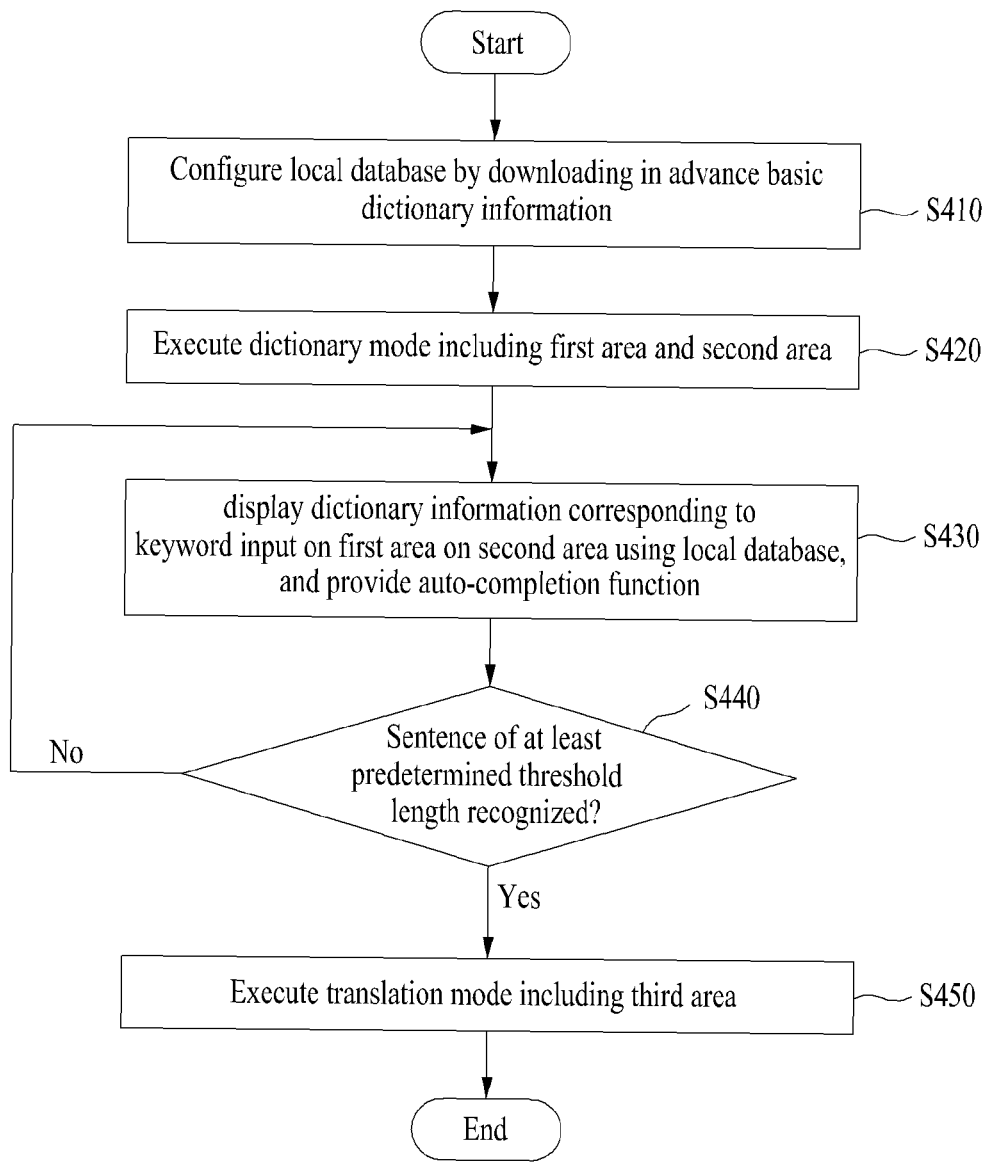
FIG. 4 is a flowchart illustrating a dictionary function providing method according to example embodiments.
Figure 5:
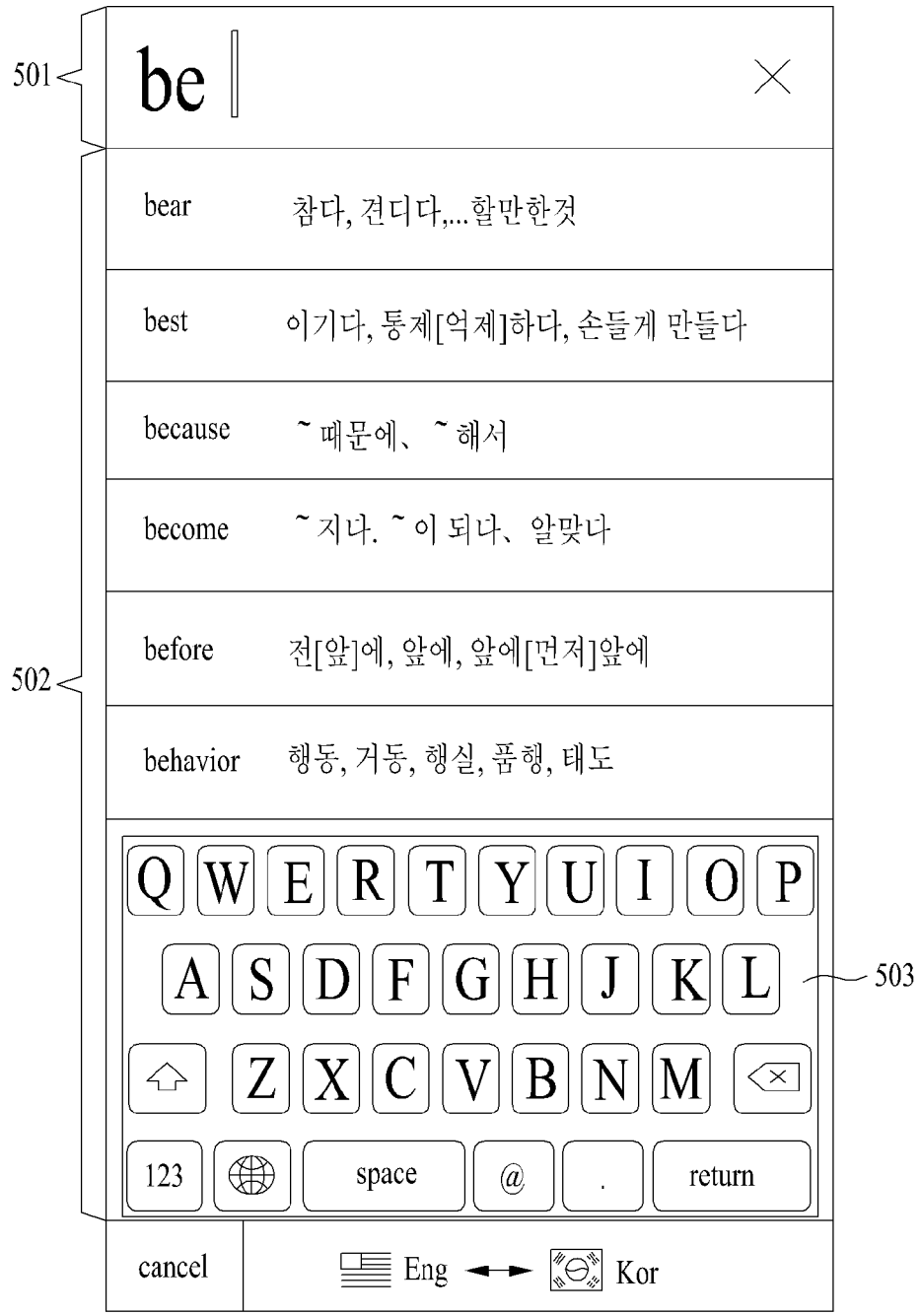
Figure 6:
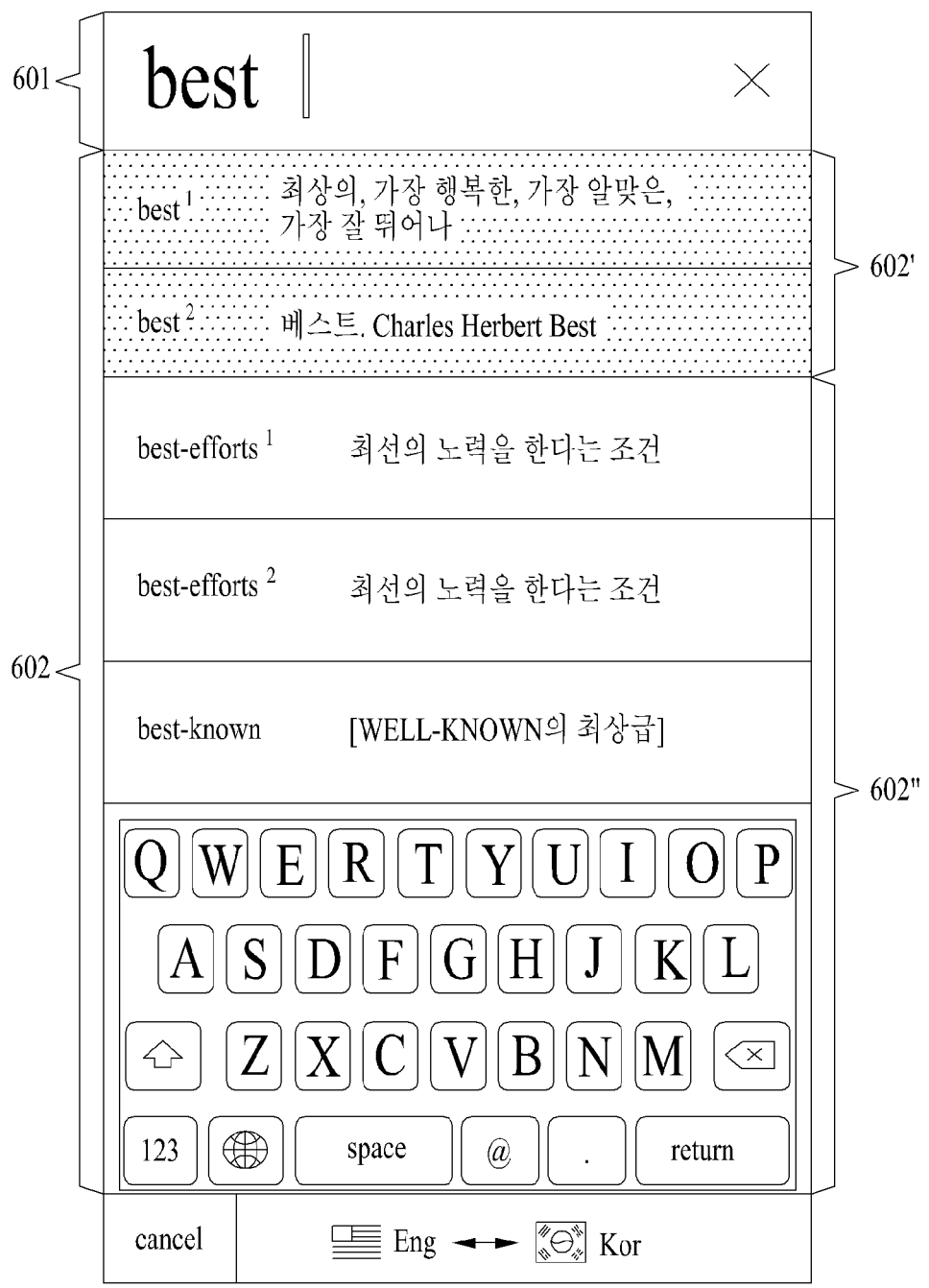
Figure 7:
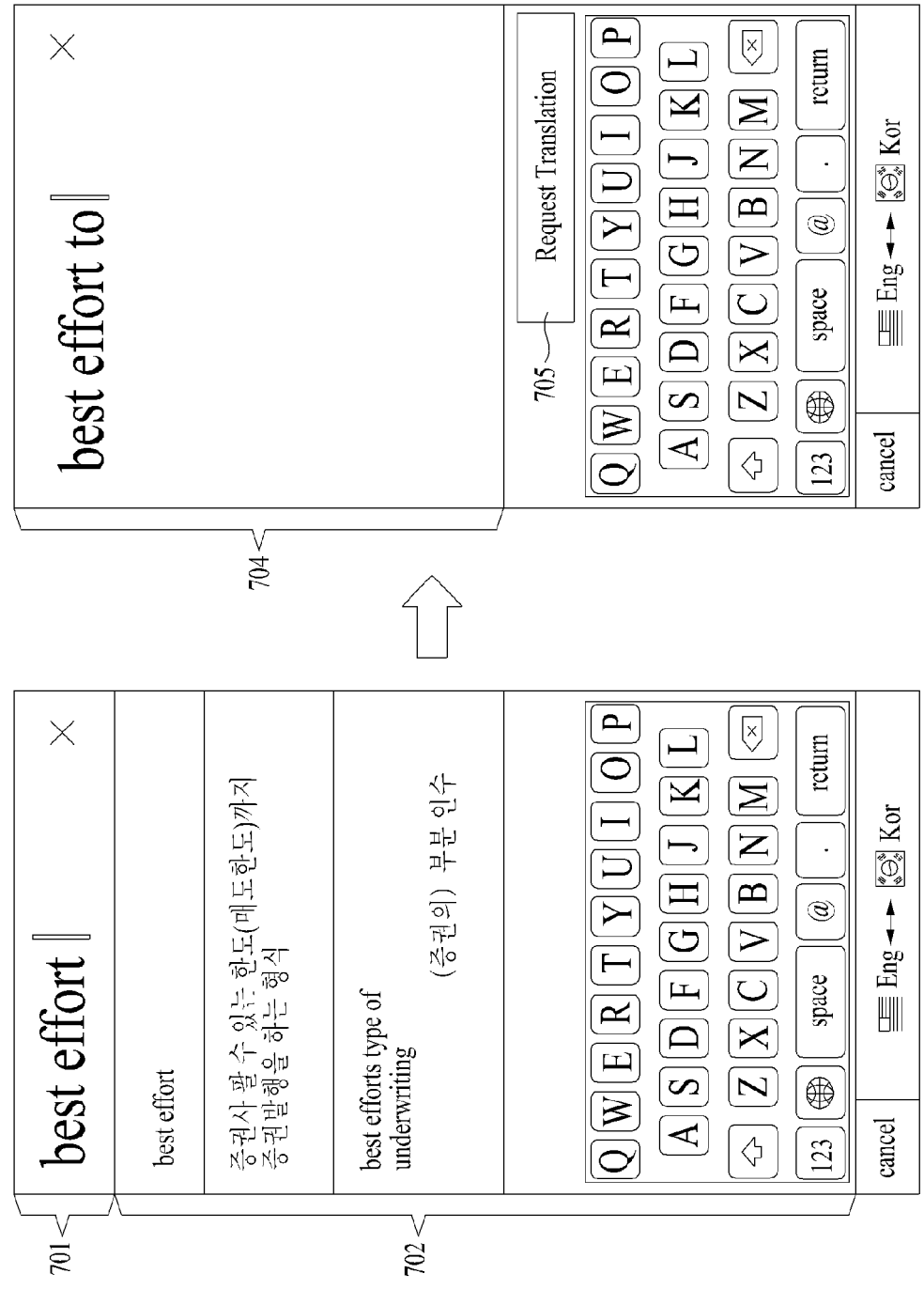

FIG. 4 is a flowchart illustrating a dictionary function providing method according to example embodiments. FIGS. 5 and 6 illustrate examples of a service screen of a dictionary mode according to example embodiments.

Referring to FIGS. 2, and 4 to 6, operations included in the dictionary function providing method according to example embodiments may be performed by the user terminal 101 functioning as the dictionary function providing system 200 of FIG. 2.

In operation S410, the loader 211 may download basic dictionary information (e.g., in advance) from a service server. For example, the loader 211 may download the basic dictionary information at a point in time at which a dictionary App is initially executed or at a point in time at which an update is required. The loader 211 may store the basic dictionary information as pre-downloaded basic dictionary information such that the pre-downloaded basic dictionary information is stored as a local database.

The local database may enable a user to verify simple dictionary information in an offline environment. The basic dictionary information stored in the local database may include a headword for each word and at least a portion of meanings with respect to a list of entire words included in a dictionary database on the service server, and additional database for an auto-completion function for a keyword.

For example, the portion of meanings of a corresponding word may be limited to a main meaning including 20 or fewer characters among a plurality of meanings of the corresponding word. The additional data for the auto-completion function may include, for example, information about root and stem of each word, information about a word inflectional form, and information about word importance.

In operation S420, the dictionary unit 212 may enter a dictionary mode in response to an execution of the dictionary App after the local database is configured.

For example, referring to FIG. 5, when operating in the dictionary mode, the processor 210 may configure the display to display a first area 501 for receiving a keyword and a second area 502 for displaying dictionary information corresponding to the keyword. The second area 502 may be divided into at least one section based on a dictionary search result.

When the first area 501 is activated in the dictionary mode, for example, when a user touches the first area 501, the processor 210 may display a keypad screen 503 for a character input such that the keypad screen 503 may overlapping at a lower end of the second area 502.

In operation S430, the dictionary unit 212 may instruct the display to display dictionary information corresponding to the keyword using the local database with respect to the received keyword, and may display dictionary information corresponding to a search result on the second area 502.

The search result may include (i) a word identical to the keyword through an auto-completion function based on the local database, (ii) a word including the keyword, (iii) a plurality of auto-complete words including an inflectional word associated with the keyword, and/or (iv) at least a portion of meanings for each word.

For example, referring to FIG. 5, when the keyword 'be' is input to the first area 501, the processor 210 may determine auto-complete words identical to 'be' or including 'be' and a main meaning of each word, and may display the same to the second area 502.

Referring to FIG. 6, when additional characters of the keyword are input, for example, when 'best' is input on a first area 601, auto-complete words identical to 'best' or including 'best' and a main meaning of each word may be displayed on a second area 602. The second area 602 may be divided into a first section 602' for displaying dictionary information of an identical word matching 'best' and a second section 602" for displaying dictionary information of a similar word including 'best'.

When providing the dictionary search result corresponding to the keyword, the dictionary unit 212 may extract and sort auto-complete words of the keyword based on an inter-word form identity, a word inflectional form, and a word importance.

As an example, the dictionary unit 212 may extract, from the local database, auto-complete words identical to the keyword or including the keyword based on a form identity, and may sort the extracted auto-complete words based on word importance.

As another example, the dictionary unit 212 may extract, as auto-complete words, a word identical to the keyword based on the form identity and the word inflectional form, a similar word including the keyword, and an inflectional word associated with the keyword, and may sort the extracted auto-complete words based on word importance. The processor 210 may place the identical word among words extracted as auto-complete words on a top and the similar word or the inflectional word may be sorted based on word importance to be listed below the identical word.

As still another example, the dictionary unit 212 may extract auto-complete words based on the form identity and may additionally extract inflectional words associated with the keyword when the number of extracted auto-complete words are less than or equal to a desired (or, alternatively, predetermined) value, and the dictionary unit 212 may then sort the extracted auto-complete words and inflectional words based on word importance.

When a user selects a desired (or, alternatively, predetermined) word included in a search result, the dictionary unit 212 may switch to a communication environment with the service server 100 and may display the entire dictionary information of the desired (or, alternatively, predetermined) word through additional download or web.

For example, when the user selects 'best[1]' corresponding to a first result on the second area 602 of FIG. 6, the dictionary unit 212 may request entire dictionary information about 'best[1]' from the service server 100.

In response to the request, the user terminal 101 may receive the entire dictionary information stored in a dictionary database associated with the service server 100 and then the user terminal 101 may display the entire dictionary information of the desired (or, alternatively, predetermined) word 'best[1]' on the display. The entire dictionary information received from the service server in response to a selection on the second area 602 may include the entire meanings for each word class, such as a noun, a verb, an adjective, and an adverb, an inflectional word, a related word/idiom, synonym/antonym, a related example text, a translation of an example text, and comments on a translation.

Therefore, in the example embodiments, the user terminal 101 may configure the local database 250 by downloading in advance partial dictionary information, that is, a headword for each word and a main meaning with respect to a list of entire words and additional data capable of providing an auto-completion result. Accordingly, simple dictionary information including the auto-completion result may be verified in an offline environment. In the example embodiments, when the user selects a desired (or, alternatively, predetermined) word from the dictionary search result in the offline environment, the user may verify the entire dictionary information of the desired (or, alternatively, predetermined) word provided from the service server 100 by switching to an online environment.

In operations S440 and S450, the switcher 213 may automatically switch from the dictionary mode to a translation mode when the keyword input on the first area in the dictionary mode reaches a threshold length and thus is recognized by the processor 210 as a sentence of the threshold length or more.

In some example embodiments, the processor 210 may recognize the keyword input as a sentence when the input is a complete sentence. In other example embodiments, the processor 210 may recognize the keyword input as a sentence when the input includes two or more words such as a phrase or a clause. As an example, the threshold length refers to a criterion for switching from the dictionary mode to the translation mode, and may indicate a case that satisfies all of a condition that a keyword is input using two words with a space and a condition that an auto-complete word of the keyword is absent. That is, the switcher 213 may support an automatic switch to the translation mode by recognizing a corresponding keyword as a sentence from a point in time at which an auto-completion result about the keyword including two or more words is not displayed.

When the user terminal 101 is operating in the translation mode, the processor 210 may instruct the display to display a third area for receiving a sentence, that is, a source text to be translated.

FIGS. 8 to 12 illustrate examples of a service screen of a translation mode according to example embodiments.

Figure 8:
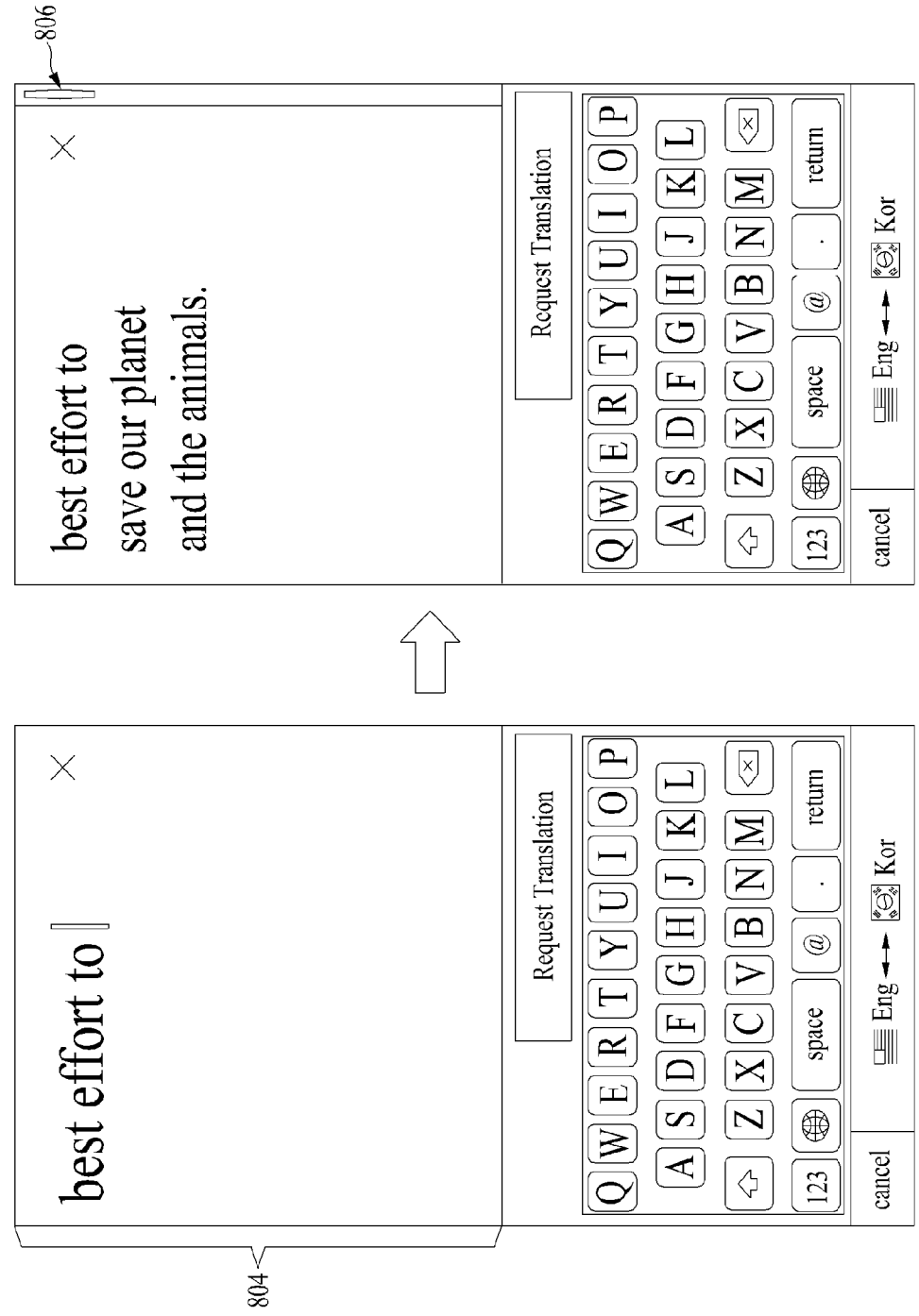

Referring to FIG. 8, the processor 210 operates in the dictionary mode and displays an auto-completion result on a second area 802 of the display in response to keyword 'best effort' input on a first area 801.

Thereafter, when the keyword is extended to 'best effort to', the processor 210 may determine that a length of the keyword is greater than or equal to the threshold, and therefore, that the keyword has a length at which an auto-complete word is absent. The switcher 213 may switch from the dictionary mode to the translation mode.

In this example, while switching to the translation mode, the processor 210 may delete the second area 802 and extend the first area 801 such that the first area 801 is changed to a third area 804 of a format for receiving a translation. In the translation mode, a user interface (UI) 805 for requesting a translation of a sentence input on the third area 804 may be displayed together with the third area 804.

A target translation language relationship used for translation in the translation mode may be set to a same language relationship as a dictionary search language relationship used during the dictionary mode. For example, when English→Korean is set as the language relationship in the dictionary mode, a language relationship of the translation mode may be set as English→Korean.

In the translation mode, the processor 210 may automatically adjust a font size applied to a third area based on the number of characters of a sentence input on the third area in the translation mode. Alternatively, a scroll interface may be provided on the third area.

Figure 9:
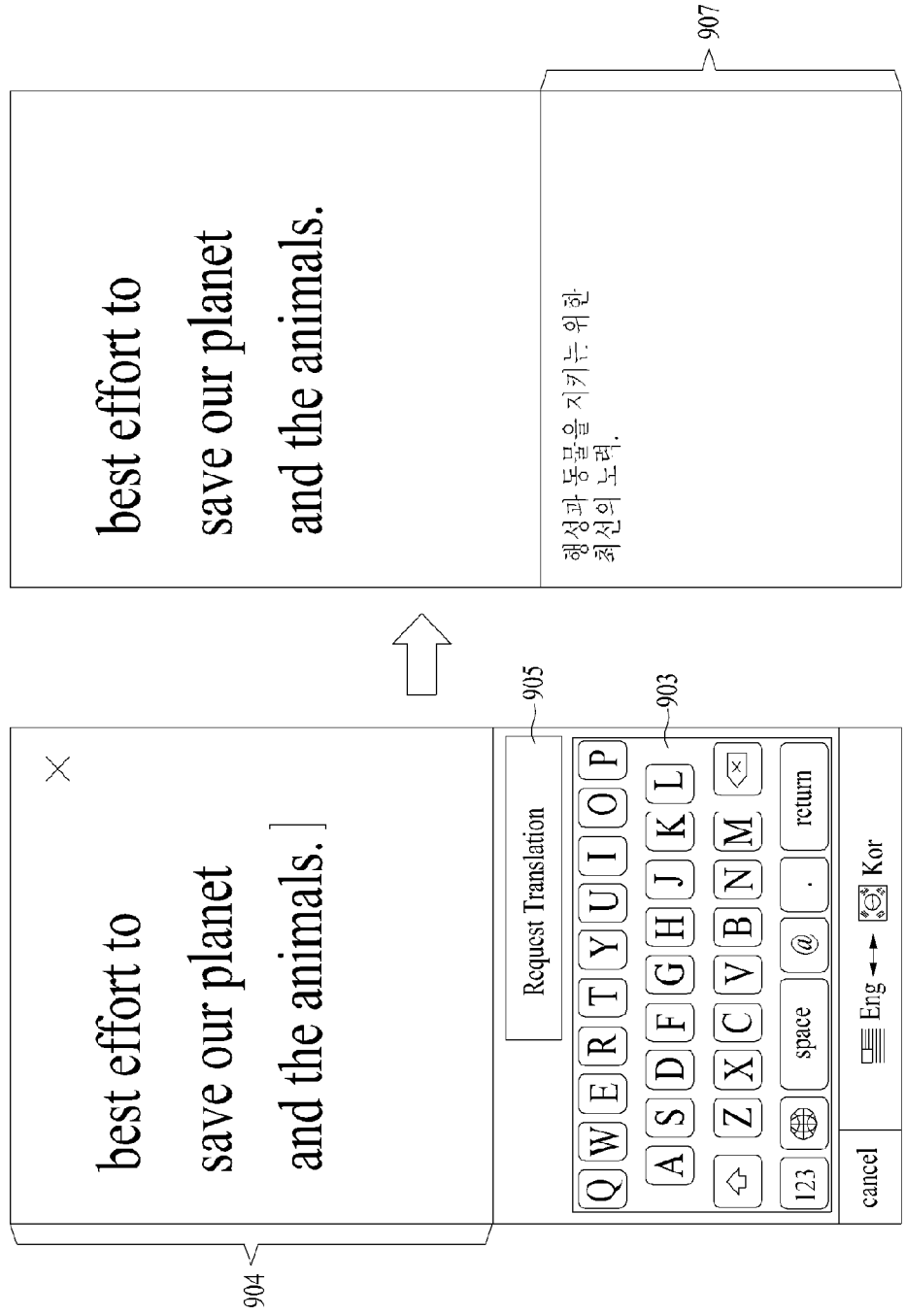

For example, referring to FIG. 9, when a sentence input on a third area 904 is extended from 'best effort to' to 'best effort to save our planet and the animals', a font size gradually decreases according to an increase in the number of characters. Also, when the number of characters constituting a sentence input on the third area 904 exceeds a set value, or when the font size adjusted according to an increase in the number of characters reaches a preset minimum size, the processor 210 may display a scroll interface 906 on the third area 904.

The translator 214 may request the service server 100 to translate a sentence, for example a source text input in the translation mode, and the user terminal 101 may display a translation provided from the service server 100 on a screen of the translation mode.

Figure 10:
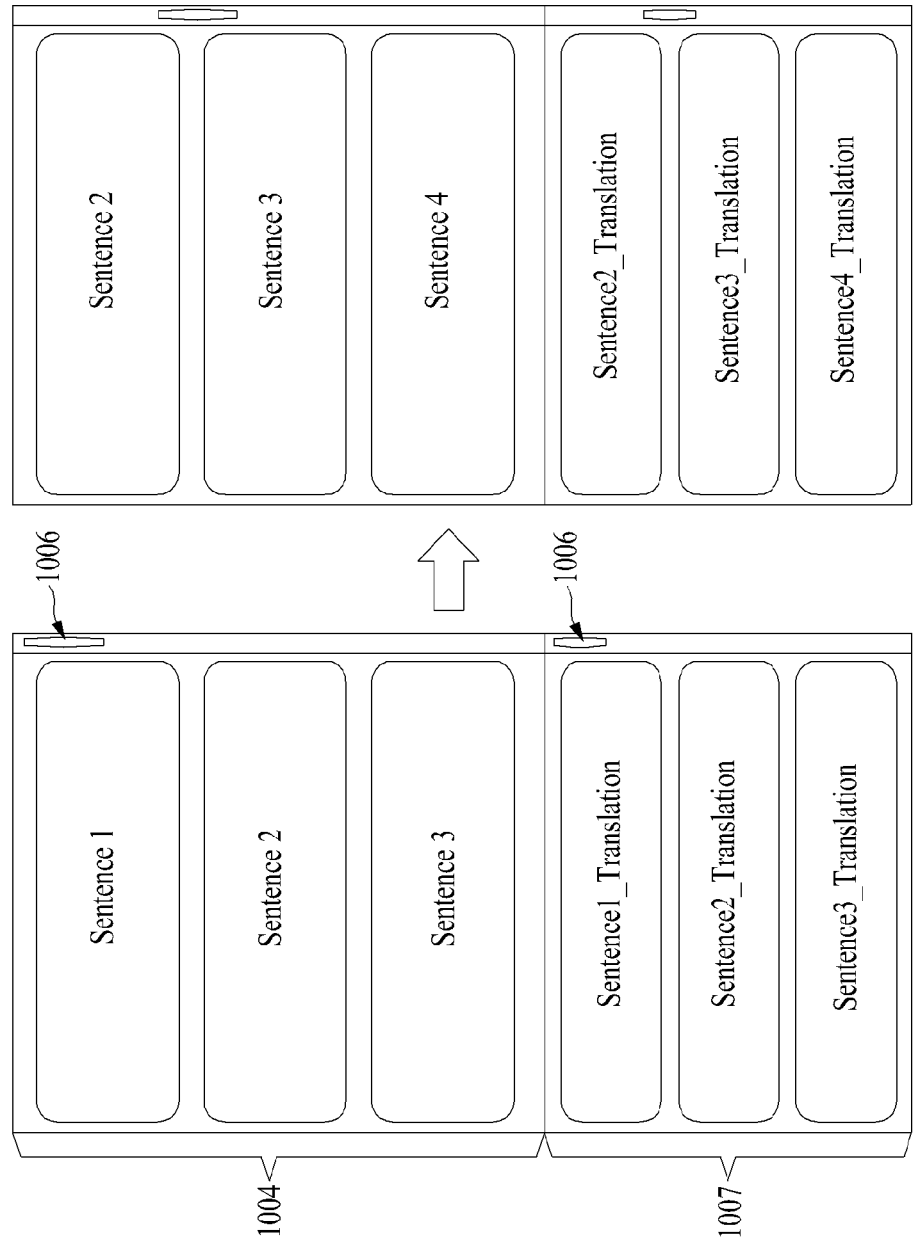

For example, referring to FIG. 10, in the translation mode, the translator 214 may request the service server 100 for a translation of a sentence input on a third area 1004 based on the target translation language relationship in response to an input of a translation request UI 1005. The processor 210 may display the translation at a lower end of the third area 1004 when the translation is received from the service server 100.

For example, when the translation request UI 1005 is input in the translation mode as illustrated in FIG. 10, the processor 210 may replace a keypad screen 1003 with a translation providing area 1007 to thereby display the translation of the source text input by a user.

As illustrated in FIG. 10, in the case of displaying the source text and the translation simultaneously, the translator 214 may synchronize and automatically adjust a scroll of the third area 1004 and the translation providing area 1007 so that corresponding sentences between the source text and the translation may be displayed at the same locations.

In some example embodiments, the translator 214 may fit a display location for each sentence or each paragraph between the source text and the translation.

For example, referring to FIG. 11, when a source text input on a third area 1104 is divided into four sentences, the processor 210 may display a translation at a location corresponding to the source text even on a translation providing area 1107. When a scroll interface 1106 is downwardly scrolled on the third area 1104 or the translation providing area 1107, the processor 210 may automatically adjust a sentence displayed on the third area 1104 and a translation displayed on the translation providing area 1107 such that the sentence and translation are displayed at corresponding same locations.

The translator 214 may provide dictionary information of one or more words included in the source text and/or the translation in the translation mode using the local database. The dictionary information may be displayed at a lower end of the translation providing area or may be overlappingly displayed on the translation providing area using a separate window or a popup. The translator 214 may display dictionary information about a desired (or, alternatively, predetermined) word selected from a source text or a translation by a user.

Figure 12:
Figure 12:

For example, referring to FIG. 12, when the user selects a desired (or, alternatively, predetermined) word A from a source text, the translator 214 may highlight the desired (or, alternatively, predetermined) word A and a translated word A' that matches the desired (or, alternatively, predetermined) word A in a translation and may overlappingly display dictionary information 1208 about the desired (or, alternatively, predetermined) word A on a translation providing area.

A language of dictionary information may be determined based on whether a word selected by the user is a source text or a translation. In an example in which a translation language relationship is set as English→Korean in the translation mode, when the desired (or, alternatively, predetermined) word A is selected from the source text as illustrated in FIG. 12, the dictionary information 1208 of English→Korean may be provided. Likewise, when a desired (or, alternatively, predetermined) word B is selected from a translation as illustrated in FIG. 12, dictionary information 1308 of Korean→English may be provided.

As another example, the translator 214 may automatically select at least one desired (or, alternatively, predetermined) word from among words included in a sentence, that is, a source text input on a third area, and may display dictionary information of the desired (or, alternatively, predetermined) word. Here, a method of automatically selecting a desired (or, alternatively, predetermined) word may select a desired (or, alternatively, predetermined) word based on a priority that refers to local or web search history in the dictionary mode. For example, by selecting, from among words included in a source text, a word having a search history of additional dictionary information through a web in the dictionary mode, dictionary information of a corresponding word may be displayed when providing a translation.

In the example embodiments, when a keyword input is extended and thereby recognized as a sentence of at least a desired (or, alternatively, predetermined) length in the dictionary mode, it is possible to receive the sentence as a source text to be translated and to provide a translation of the source text by automatically switching from the dictionary mode to a translation mode.

Figure 13:
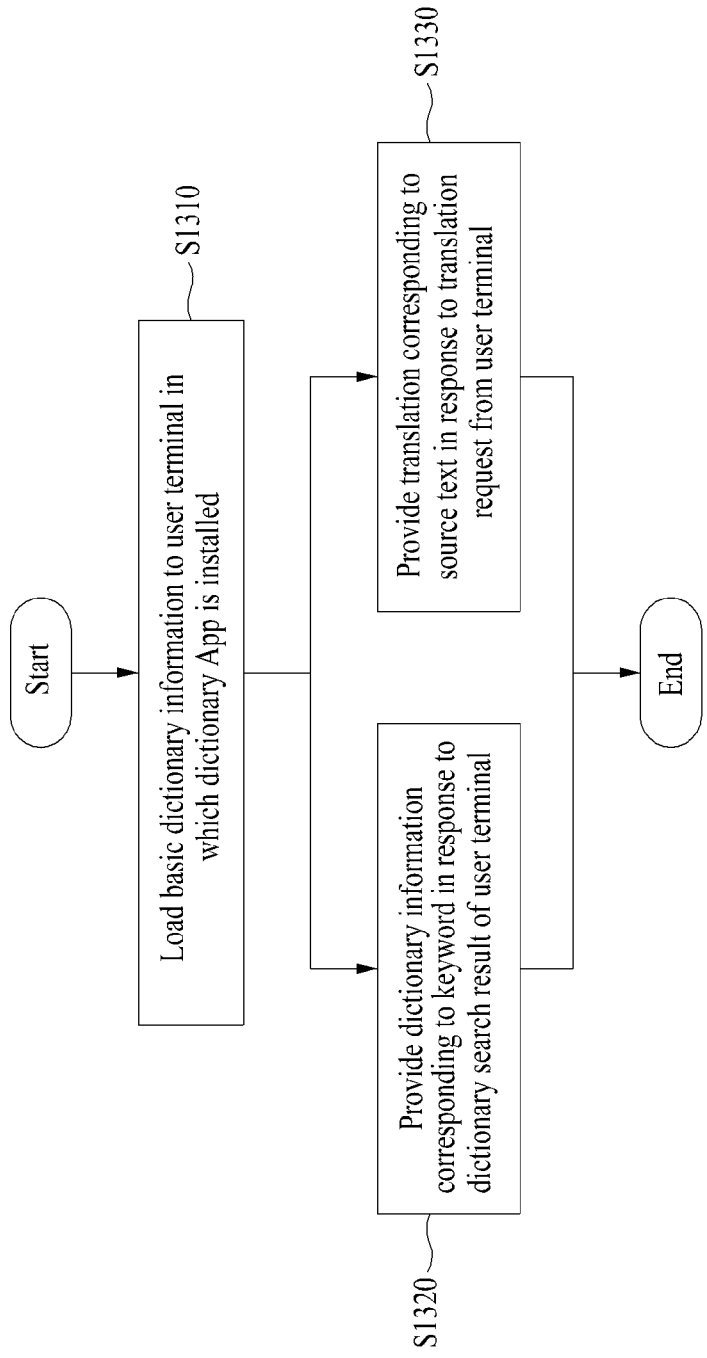
FIG. 13 is a flowchart illustrating a dictionary-translation service providing method according to example embodiments.

FIG. 13 is a flowchart illustrating a dictionary-translation service providing method according to example embodiments.

Referring to FIGS. 3 and 13, the operations of the dictionary-translation service providing method may be performed by the service server 100 described above with reference to FIG. 3.

In operation S1310, the loader 311 may load basic dictionary information onto the user terminal 101 that is partial dictionary information of the entire dictionary information for a dictionary service in response to a request from the user terminal 101 in which a dictionary App is installed.

The basic dictionary information may include a headword for each word and at least a portion of meanings with respect to a list of entire words included in a database on the service server 100, and additional data for an auto-completion function of a keyword so that a user may simply verify dictionary information in a local environment of the user terminal 101 without connecting to the service server 100.

For example, at least a portion of meanings may be limited to a main meaning including 20 or fewer characters among a plurality of meanings of a corresponding word. The additional data for the auto-completion function may include, for example, information about root and stem of each word, information about a word inflectional form, and information about word importance.

In operation S1320, in response to a request from the user terminal 101 for a dictionary search for a desired (or, alternatively, predetermined) word, the provider 312 may provide the entire dictionary information of the desired (or, alternatively, predetermined) word to the user terminal 101 via a connection between the service server 100 and the user terminal 101. For example, via a download or an internet connection.

For example, to provide the entire dictionary information to the user terminal 101, the provider 312 may provide the user terminal 101 with, for example, the entire meanings for each word class, such as a noun, a verb, an adjective, and an adverb, an inflectional word, a related word/idiom, synonym/antonym, a related example text, a translation of an example text, and comments on a translation.

In operation S1330, in response to a request from the user terminal 101 for translating a source text, the provider 312 may translate the source text using a target language and may provide a translation result to the user terminal 101.

As an example, through an interaction with a translation engine to provide a machine translation service, the provider 312 may automatically create a translation of the source text using a rule-based machine translation model, a statistics-based machine translation model, and a hybrid machine translation model in which a rule-based method and a statistics-based method are mixed.

Accordingly, in the example embodiments, it is possible to provide a portion of dictionary information in advance so that the user may verify simple dictionary information in a local environment of the user terminal 101, and to provide additional dictionary information in response to a subsequent request from the user terminal 101. Further, by providing a dictionary-translation service in which a dictionary function and a translation function are combined, it is possible to immediately provide a translation service at a point in time at which the user terminal 101 automatically switches to a translation mode.

Figure 14:
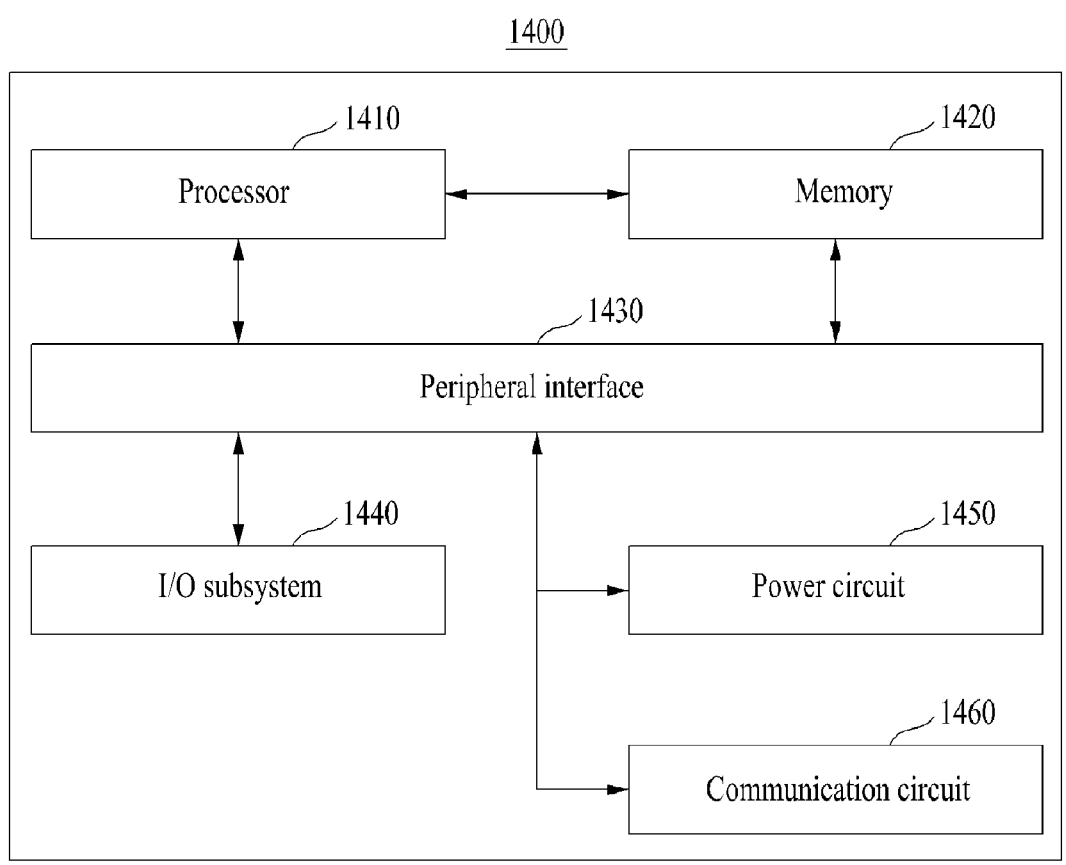
FIG. 14 is a block diagram illustrating an example of a configuration of a computer system according to example embodiments.

FIG. 14 is a block diagram illustrating an example of a configuration of a computer system 1400 according to example embodiments.

Referring to FIG. 14, the computer system 1400 may include at least one processor 1410, a memory 1420, a peripheral interface 1430, an input/output (I/O) subsystem 1440, a power circuit 1450, and a communication circuit 1460. The computer system 1400 may correspond to a user device, for example, the user terminal 101.

The memory 1420 may include, for example, a high-speed random access memory (HSRAM), a magnetic disk, a static random access memory (SRAM), a dynamic RAM (DRAM), read only memory (ROM), a flash memory, and a non-volatile memory. The memory 1420 may include a software module, an instruction set, or a variety of data required for an operation of the computer system 1400. Here, an access from another component such as the processor 1410 and the peripheral interface 1430 to the memory 1420 may be controlled by the processor 1410.

The peripheral interface 1430 may couple an input device and/or output device of the computer system 1400 with the processor 1410 and the memory 1420. The processor 1410 may perform a variety of functions for the computer system 1400 and process data by executing the software module or the instruction set stored in the memory 1420.

The I/O subsystem 1440 may couple various I/O peripheral devices with the peripheral interface 1430. For example, the I/O subsystem 1440 may include a controller for coupling the peripheral interface 1430 and a peripheral device such as a monitor, a keyboard, a mouse, a printer, and a touch screen or a sensor depending on a necessity. The I/O peripheral devices may be coupled with the peripheral interface 1430 without using the I/O subsystem 1440.

The power circuit 1450 may supply a power to all of or a portion of components of a terminal. For example, the power circuit 1450 may include a power management system, at least one power source such as a battery and alternating circuit (AC), a charge system, a power failure detection circuit, a power converter or inverter, a power status indicator, or other components for creating, managing and distributing power.

The communication circuit 1460 enables communication with another computer system using at least one external port. Alternatively, as described above, the communication circuit 1460 may enable communication with another computer system by including a radio frequency (RF) circuit and thereby transmitting and receiving an RF signal known as an electromagnetic signal.

The example embodiments of FIG. 14 are only an example of the computer system 1400. The computer system 1400 may have a configuration or an arrangement for omitting a portion of the components illustrated in FIG. 14, further including components not illustrated in FIG. 14, or coupling two or more components.

For example, the computer system 1400 may further include a display (not shown). The display may be a liquid crystal display (LCD), a light emitting diode (LED), a plasma display panel (PDP), or an organic light emitting diode (OLED). However, example embodiments are not limited thereto. For example, the display may be touch panel. The touch panel may be a resistive overlay type, a capacitive overlay type, a surface acoustic wave (SAW) type, an infrared beam type, or a piezoelectric type. However, example embodiments are not limited thereto.

For example, a computer system for a communication terminal of a mobile environment may further include a touch screen, a sensor, and the like, in addition to the components of FIG. 14. A circuit for RF communication using a variety of communication methods, for example, wireless fidelity (Wi-Fi), $3^{rd}$ generation (3G), long term evolution (LTE), Bluetooth, near field communication (NFC), and ZigBee, may be included in the communication circuit 1460. Components includable in the computer system 1400 may be configured as hardware that includes an integrated circuit specified for at least one signal processing or application, software, or a combination of hardware and software.

The methods according to the example embodiments may be configured in a program instruction form executable through various computer systems and thereby recorded in non-transitory computer-readable media.

A program according to the example embodiments may be configured as a PC-based program or an application exclusive for a mobile terminal. The dictionary App according to the example embodiments may be configured as an independently operating program or may be configured in an in-app form of a desired (or, alternatively, predetermined) application to be operable on the desired (or, alternatively, predetermined) application.

Also, the methods according to the example embodiments may be performed in such a manner that an application associated with a server system providing a dictionary-translation service controls the user terminal 101. As an example, the application may include a module configured to execute a dictionary mode including a first area for receiving a keyword and a second area for displaying a dictionary search result of the keyword, and a module configured to automatically switch from the dictionary mode to a translation mode in response to an input of the keyword being extended to a threshold length on the first area. Here, the module configured to automatically switch to the translation mode may switch to the translation mode including a third area for receiving the sentence as a source text to be translated. Also, the application may be installed in the user terminal through a file provided from a file distribution system. As an example, the file distribution system may include a file transmitter (not shown) to transmit the file in response to a request from the user terminal.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as optical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments.

It will be apparent to those skilled in the art that various modifications and variation can be made in the example embodiments without departing from the spirit or scope of the example embodiments. Thus, it is intended that the example embodiments cover the modifications and variations provided they come within the scope of the appended claims and their equivalents.

What is claimed is:

1. A method of providing a dictionary service to a user terminal, the method comprising:
    configuring a first area of a display to receive a keyword as an input and a second area of the display to display a dictionary search result of the keyword when the user terminal is operating in a dictionary mode;
    switching from the dictionary mode to a translation mode if the keyword input into the first area is greater than or equal to a threshold length, the switching includes reconfiguring a user interface such that the first area of the display extends into a third area of the display;
    setting the keyword as a source text to translate and display in the third area of the display, if the keyword is greater than or equal to the threshold length; and
    determining as the dictionary search result a definition of the keyword and displaying, in the second area, the dictionary search result, if the keyword is less than the threshold length.

2. The method of claim 1, further comprising:
    establishing a local database before receiving the keyword by downloading basic dictionary information from a dictionary database associated with a server, the basic dictionary information including a headword for each word and an abbreviated meaning of each word,
    wherein the configuring includes,
        searching the local database based on the keyword, and
        displaying, on the second area, the dictionary search result such that the dictionary search result includes a plurality of auto-complete words corresponding to the keyword and a meaning for the plurality of auto-complete words.

3. The method of claim 2, wherein the displaying comprises:
    sorting the plurality of auto-complete words based on word importance when the plurality of auto-complete words is retrieved.

4. The method of claim 2, wherein the displaying comprises:
    extracting the plurality of auto-complete words using at least one of an inter-word form identity and a word inflectional form, and
    sorting the plurality of auto-complete words based on word importance.

5. The method of claim 2, wherein the displaying comprises:
    dividing the second area into a first section and a second section, the first section being a section for displaying an identical word matching the keyword among the plurality of auto-complete words, and the second section being a section for displaying at least one of a similar word similar to the keyword and an inflectional word associated with the keyword.

6. The method of claim 2, wherein the configuring comprises:
    receiving an extended dictionary search result from the server in response to a selection of a word from the dictionary search result; and
    displaying the extended dictionary search result.

7. The method of claim 2, wherein the switching determines that the keyword is greater than or equal to the threshold length when the keyword includes two or more words with a space there between and the keyword does not contain one or more of the plurality of auto-complete words.

8. The method of claim 1, wherein the threshold length is two or more words with a space there between.

9. The method of claim 1, further comprising:
    receiving a translation of the keyword from the server in response to switching to the translation mode; and
    displaying the translation on a fourth area of the display distinguished from the third area.

10. The method of claim 9, wherein the displaying comprises:
    displaying, on the fourth area, the dictionary search result of a word selected by a user from among words in the translation or the keyword using the local database.

11. The method of claim 9, wherein the displaying comprises:
displaying, on the fourth area, the dictionary search result of a word having a search history in the dictionary mode among words in the translation using the local database.

12. A service server comprising:
a loader configured to,
transmit basic dictionary information to a first area of a display on a user terminal having a dictionary application installed thereon, the basic dictionary information including a headword for each word and an abbreviated meaning of each word in a dictionary database, the abbreviated meaning being a definition of the each word from the basic dictionary information, when a keyword input on a second area of the display of the user terminal is less one of than a threshold length or is a single word, a definition of the keyword is provided to the user terminal as a dictionary search result; and
a provider configured to,
provide, to the first area, dictionary information associated with the keyword using the dictionary database in response to a request from the user terminal for an additional dictionary search for the keyword, the additional dictionary search including an unabridged meaning of the keyword, and
provide, to a third area of the display, a translation of the keyword using a translation engine in response to a request from the user terminal to translate the keyword by reconfiguring a user interface, if the keyword input by the user terminal is greater than or equal to the threshold length of two or more words, the reconfiguring the user interface including extending the first area of the display into the third area of the display.

13. A file distribution system for distributing an application to a user terminal, the file distribution system comprising:
a file transmitter configured to transmit a file containing the application to the user terminal in response to a request from the user terminal, the application when executed by a processor associated with the user terminal, configures the user terminal to,
configure a first area of a display to receive a keyword as an input and a second area of the display to display a dictionary search result of the keyword when the user terminal is operating in a dictionary mode; and
switch from the dictionary mode to a translation mode by reconfiguring a user interface if the keyword input into the first area is greater than or equal to a threshold length, the reconfiguring the user interface including extending the first area of the display into a third area of the display,
set the keyword as a source text to translate and display in the third area of the display, if the keyword is greater than or equal to the threshold length, and
determine as the dictionary search result a definition of the keyword and display, in the second area, the dictionary search result, if the keyword is less than the threshold length.

14. The file distribution system of claim 13, wherein the application, when executed by the processor, further configures the user terminal to,
establish a local database before receiving the keyword by downloading basic dictionary information from a dictionary database associated with a server, the basic dictionary information including a headword for each word and an abbreviated meaning of each word,
search the local database based on the keyword, and
display, on the second area, the dictionary search result such that the dictionary search result includes a plurality of auto-complete words corresponding to the keyword and a meaning for the plurality of auto-complete words.

15. The file distribution system of claim 14, wherein the application, when executed by the processor, configures the user terminal to,
receive a dictionary search result from the server, and
display the dictionary search result in response to a selection of a word from the dictionary search result.

16. The file distribution system of claim 14, wherein the application, when executed by the processor, configures the user terminal to,
determine that the keyword is greater than or equal to a threshold length when the keyword includes two or more words with a space therebetween and the keyword does not contain one or more of the plurality of auto-complete words.

17. A user terminal configured to execute a dictionary application thereon, the user terminal comprising:
a display;
an input interface configured to receive an input from a user;
a network interface configured to communicate with a server; and
a processor configured to,
store, in a local database, basic dictionary information received from the server, the basic dictionary information including a dictionary of words in which, for each of the words, an abbreviated meaning is included therein,
receive, via the input interface, a keyword input by the user at a first area of the display,
determine that the user is requesting definition of the keyword, if the keyword is a single word,
determine that the user is requesting translation of the keyword, if the keyword is a phrase that includes two or more words,
search, in the local database, for a dictionary search result among the basic dictionary information based on the keyword, if the processor determines that the user is requesting the definition of the keyword,
request, via the network interface, a translation of the phrase by the server, if the processor determines that the user is requesting the translation of the keyword, and
display the dictionary search result on a second area of the display and display the translation on a third area of the display by reconfiguring a user interface such that the first area of the display extends into the third area of the display.

18. The user terminal of claim 17, wherein
the dictionary search result includes a plurality of candidate words corresponding to the keyword, and
the processor is configured to display the plurality of candidate words sorted by a similarity between a respective one of the plurality of candidate words and the keyword.

19. The user terminal of claim 17, wherein the processor is configured to download the basic dictionary information from the server when the dictionary application is installed or upgraded such that the processor is configured to search the local data irrespective of whether the user terminal is online.

20. The user terminal of claim 17, wherein the processor is configured to
   receive, via the input interface, a selection indicating a selected word from the translation, and
   request, via the network interface, an unabridged definition of the selected word in response to the selection.

* * * * *